(12) United States Patent
Riva et al.

(10) Patent No.: US 12,248,794 B2
(45) Date of Patent: Mar. 11, 2025

(54) SELF-SUPERVISED SYSTEM FOR LEARNING A USER INTERFACE LANGUAGE

(71) Applicant: Microsoft Technology Licensing, LLC, Redmond, WA (US)

(72) Inventors: Oriana Riva, Redmond, WA (US); Shweti Mahajan, Kirkland, WA (US); Pratyay Banerjee, Tempe, AZ (US); Kushal Arora, Montreal (CA); Weiwei Yang, Seattle, WA (US); Christopher Miles White, Seattle, WA (US); Sahisnu Mazumder, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 423 days.

(21) Appl. No.: 17/701,313

(22) Filed: Mar. 22, 2022

(65) Prior Publication Data

US 2023/0305863 A1 Sep. 28, 2023

(51) Int. Cl.
| | |
|---|---|
| *G06F 9/451* | (2018.01) |
| *G06F 40/284* | (2020.01) |
| *G06F 40/40* | (2020.01) |
| *G06V 10/774* | (2022.01) |
| *G06V 10/80* | (2022.01) |
| *G06V 40/40* | (2022.01) |

(52) U.S. Cl.
CPC ............ *G06F 9/451* (2018.02); *G06F 40/284* (2020.01); *G06F 40/40* (2020.01); *G06V 10/774* (2022.01); *G06V 10/811* (2022.01)

(58) Field of Classification Search
CPC ........ G06F 9/451; G06F 40/284; G06F 40/40; G06F 40/205; G06F 9/453; G06V 10/774; G06V 10/811; G06N 3/045; G06N 3/0895
See application file for complete search history.

(56) References Cited

U.S. PATENT DOCUMENTS

| | | | |
|---|---|---|---|
| 11,221,833 B1 * | 1/2022 | Huang | G06F 9/451 |
| 11,562,147 B2 * | 1/2023 | Wang | G06F 18/21 |
| 2018/0157386 A1 * | 6/2018 | Su | G06V 30/19173 |
| 2020/0410056 A1 * | 12/2020 | Chen | G06N 20/00 |

(Continued)

OTHER PUBLICATIONS

"Common mobile/Web App Icons", Retrieved from: http://web.archive.org/web/20201031141544/https://www.kaggle.com/testdotai/common-mobile-web-app-icons, Oct. 31, 2020, 2 Pages.

(Continued)

*Primary Examiner* — Iriana Cruz
(74) *Attorney, Agent, or Firm* — Schwegman Lundberg & Woessner, P.A.

(57) ABSTRACT

A computer implemented method includes accessing training data that includes images, associated alternative text, and proximately located text providing instructions describing a user interface. The images are paired with text captions derived from the proximately located text and image's alternative text, training a vision and language model in a self-supervised manner using language masking, region masking, and image-text alignment techniques on respective image region features and tokenized text captions. Fine-tuning of the vision and language model is performed to obtain a specialized model representing user interface elements and associated functions.

20 Claims, 7 Drawing Sheets

(56) References Cited

U.S. PATENT DOCUMENTS

2022/0382565 A1* 12/2022 Sunkara ............... G06N 3/084
2023/0360388 A1* 11/2023 Singh .................. G06V 30/10

OTHER PUBLICATIONS

"Material design icons", Retrieved from: https://github:com/google/material-design-icons, Retrieved Date: Feb. 23, 2022, 2 Pages.

Bai, et al., "UIBert: Learning Generic Multimodal Representations for UI Understanding", In Repository of arXiv:2107.13731v2, Aug. 10, 2021, 8 Pages.

Bisk, et al., "Piqa: Reasoning about physical commonsense in natural language", In Proceedings of the AAAI Conference on Artificial Intelligence, Apr. 3, 2020, pp. 7432-7439.

Branavan, et al., "Reinforcement Learning for Mapping Instructions to Actions", In the Proceedings of the Joint Conference of the 47th Annual Meeting of the ACL and the 4th International Joint Conference on Natural Language Processing of the AFNLP, Aug. 2, 2009, pp. 82-90.

Canny, John, "A Computational Approach to Edge Detection", In Journal of IEEE Transactions on Pattern Analysis and Machine Intelligence, vol. 8, Issue 6, Nov. 1986, pp. 679-698.

Chen, et al., "Object Detection for Graphical User Interface: Old Fashioned or Deep Learning or a Combination?", In Proceedings of the 28th ACM joint meeting on European Software Engineering Conference and Symposium on the Foundations of Software Engineering, Nov. 8, 2020, pp. 1202-1214.

Chen, et al., "Unblind Your Apps: Predicting Natural-Language Labels for Mobile GUI Components by Deep Learning", In proceedings of IEEE/ACM 42nd International Conference on Software Engineering (ICSE), Oct. 5, 2020, pp. 322-334.

Chen, et al., "UNITER: Universal Image-Text Representation Learning", In 16th European Conference on Computer Vision, Aug. 23, 2020, 17 Pages.

Devlin, et al., "BERT: Pre-training of Deep Bidirectional Transformers for Language Understanding", In Proceedings of Conference of the North American Chapter of the Association for Computational Linguistics: Human Language Technologies, Jun. 2, 2019, pp. 4171-4186.

Du, et al., "PP-OCR: A Practical Ultra Lightweight OCR System", In Repository of arXiv:2009.09941v1, Sep. 21, 2020, 14 Pages.

Gur, et al., "Learning to Navigate the Web", In Proceedings of the 7th International Conference on Learning Representations, May 6, 2019, 12 Pages.

He, et al., "ActionBert: Leveraging User Actions for Semantic Understanding of User Interfaces.", In Proceedings of the 35th AAAI Conference on Artificial Intelligence, Feb. 2, 2021, pp. 5931-5938.

He, et al., "Deep Residual Learning for Image Recognition", In Proceedings of the IEEE Conference on Computer Vision and Pattern Recognition, Jun. 27, 2016, pp. 770-778.

Kingma, et al., "Adam: A Method for Stochastic Optimization", In Repository of arXiv:1412.6980v1, Dec. 22, 2014, pp. 1-9.

Kiperwasser, et al., "Simple and Accurate Dependency Parsing Using Bidirectional LSTM Feature Representations", In Journal of Transactions of the Association for Computational Linguistics, vol. 4, Jul. 1, 2016, pp. 313-328.

Krishna, et al., "Visual Genome: Connecting Language and Vision using Crowdsourced Dense Image Annotations", In International Journal of Computer Vision vol. 123, Issue 1, Feb. 6, 2017, pp. 32-73.

Li, et al., "Mapping Natural Language Instructions to Mobile UI Action Sequences", In Proceedings of the 58th Annual Meeting of the Association for Computational Linguistics, Jul. 5, 2020, pp. 8198-8210.

Li, et al., "VisualBERT: A Simple and Performant Baseline for Vision and Language", In Repository of arXiv:1908.03557v1, Aug. 9, 2019, pp. 1-14.

Li, et al., "Widget Captioning: Generating Natural Language Description for MobileUser Interface Elements", In Proceedings of the Conference on Empirical Methods in Natural Language Processing, Nov. 16, 2020, pp. 5495-5510.

Lin, et al., "Microsoft Coco: Common Objects in Context", In the Proceedings of 13th European Conference on Computer Vision, Sep. 6, 2014, pp. 740-755.

Liu, et al., "Reinforcement Learning on Web Interfaces Using Workflow-Guided Exploration", In Proceedings of the 6th International Conference on Learning Representations, Apr. 30, 2018, 15 Pages.

Liu, et al., "ROBERTa: A Robustly Optimized BERT Pretraining Approach", In Repository of arXiv:1907.11692v1, Jul. 26, 2019, 13 Pages.

Lu, et al., "VILBERT: Pretraining Task- Agnostic Visiolinguistic Representations for Visionand- Language Tasks", In Journal of Advances in Neural Information Processing Systems, vol. 32, Dec. 8, 2019, pp. 1-11.

Mazumder, et al., "A Flexible Natural Language Interface for Web Navigation", In Proceedings of the Conference of the North American Chapter of the Association for Computational Linguistics: Human Language Technologies, Jun. 6, 2021, pp. 2777-2788.

Mehrotra, Pranob, "Google is trying to limit what apps can use an Accessibility Service (again)", Retrieved from: https://www.xda-developers.com/google-trying-limit-apps-accessibility-service/, Jul. 29, 2021, 4 Pages.

Ordonez, et al., "Im2text: Describing Images Using 1 Million Captioned Photographs", In Journal of Advances in Neural Information Processing Systems, Dec. 12, 2011, pp. 1-9.

Pasupat, et al., "Mapping Natural Language Commands to Web Elements", In Proceedings of the Conference on Empirical Methods in Natural Language Processing, Oct. 31, 2018, pp. 4970-4976.

Paszke, et al., "PyTorch: An Imperative Style, High-Performance Deep Learning Library", In Journal of Advances in Neural Information Processing Systems, vol. 32, Dec. 8, 2019, 12 Pages.

Qi, et al., "ImageBERT: Cross-modal Pre-training with Large-scale Weak-supervised Image-Text Data", In Repository of arXiv:2001.07966v2, Jan. 23, 2020, 12 Pages.

Ren, et al., "Faster R-CNN: Towards Real-Time Object Detection with Region Proposal Networks", In Journal of Advances in Neural Information Processing Systems, vol. 28, Dec. 7, 2015, pp. 1-9.

Sennrich, et al., "Neural Machine Translation of Rare Words with Subword Units", In Proceedings of the 54th Annual Meeting of the Association for Computational Linguistics (vol. 1: Long Papers), Aug. 7, 2016, pp. 1715-1725.

Sharma, et al., "Conceptual Captions: A Cleaned, Hypernymed, Image Alt-text Dataset For Automatic Image Captioning", In Proceedings of the 56th Annual Meeting of the Association for Computational Linguistics, vol. 1, Jul. 15, 2018, pp. 2556-2565.

Shi, et al., "World of Bits: An Open-Domain Platform for Web-Based Agents", In Proceedings of 34th International Conference on Machine Learning, Aug. 6, 2017, 10 Pages.

Su, et al., "VL-BERT: Pre-training of Generic Visual-Linguistic Representations", In Proceedings of 8th International Conference on Learning Representations, Apr. 26, 2020, pp. 1-16.

Suzuki, et al., "Topological Structural Analysis of Digitized Binary Images by Border Following", In Journal of Computer Vision, Graphics, and Image Processing, vol. 30, Issue 1, Apr. 1985, pp. 32-46.

Tan, et al., "LXMERT: Learning Cross-Modality Encoder Representations from Transformers", In Proceedings of the Conference on Empirical Methods in Natural Language Processing and the 9th International Joint Conference on Natural Language Processing, Nov. 3, 2019, pp. 5100-5111.

Xie, et al., "Visual Entailment: A Novel Task for Fine-Grained Image Understanding", In Repository of arXiv:1901.06706v1, Jan. 20, 2019, pp. 1-12.

Yagcioglu, et al., "RecipeQA: A Challenge Dataset for Multimodal Comprehension of Cooking Recipes", In Repository of arXiv:1809.00812v1, Sep. 4, 2018, 14 Pages.

(56) References Cited

OTHER PUBLICATIONS

Deka, et al., "Rico: A Mobile App Dataset for Building Data-Driven Design Applications", In Proceedings of the 30th Annual ACM Symposium on User Interface Software and Technology, Oct. 22, 2017, pp. 845-854.

Honnibal, et al., "Industrial-Strength Natural Language Processing in Python", Retrieved from: http://web.archive.org/web/20170127001955/https://spacy.io/, Jan. 27, 2017, 6 Pages.

Banerjee, et al., "Lexi: Self-Supervised Learning of the UI Language", In Repository of arXiv:2301.10165v1, Jan. 23, 2023, 16 Pages.

"International Search Report and Written Opinion Issued in PCT Application No. PCT/US23/012869", Mailed Date: May 4, 2023, 15 Pages.

* cited by examiner

SELF-SUPERVISED SYSTEM FOR LEARNING A USER INTERFACE LANGUAGE

BACKGROUND

Humans can learn how to operate the user interface (UI) of an application by reading an instruction manual or how-to guide. Along with text, these resources often include visual content such as screenshots and images of icons referenced in the text. Teaching a computer program how to identify how to operate a user interface is technically challenging.

SUMMARY

A computer implemented method includes accessing training data that includes images, associated alternative text, and proximately located text providing instructions describing a user interface. The images are paired with text captions derived from the proximately located text and image's alternative text, training a vision and language model in a self-supervised manner using language masking, region masking, and image-text alignment techniques on respective image region features and tokenized text captions. Fine-tuning of the vision and language model is performed to obtain a specialized model representing user interface elements and associated functions.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

The ability for machine learning models to understand and operate user interfaces (UIs) is an important task. A bot that can find a UI element for performing a task, such as an interactive icon or hypertext link, by an oral description can be very useful. A model that can predict the expected output of clicking a button or link can help with page navigation.

To successfully operate a UI, models need to understand the user task and intent, and how to perform the task in the given UI.

User interface representation models have been used to allow systems to understand and operate user interfaces on a user's behalf. Training vision and language models requires high-quality paired visio-linguistic datasets. Common approaches to collect training datasets include (i) app crawling with human labelling and (ii) use of unlabeled data consisting of UI screens and associated metadata. While the former is hard to scale, in case of the latter, UI metadata, such as accessibility labels included in alternative text and structural representations of a screen's UI elements (referred to as DOM tree in webpages and View Hierarchy in Android devices) is often missing, partially defined, or not accessible for security reasons.

Figure 1:
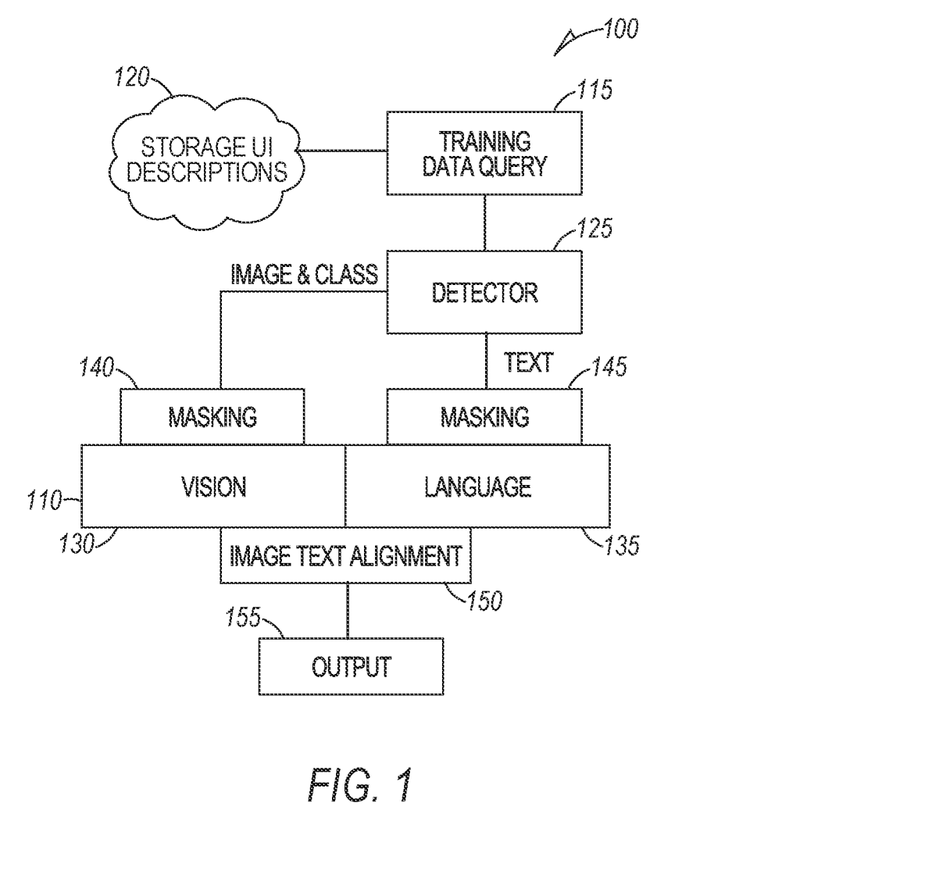
FIG. 1 is a simplified block diagram illustrating a system for creating a machine learning model to understand user interfaces according to an example embodiment.

FIG. 1 is a simplified block diagram illustrating a system 100 for creating a machine learning model to understand user interfaces. System 100 includes an improved vision and language pre-trained model 110 that is designed to handle the unique features of user interfaces including their text richness and context sensitivity. In various examples, textual instructions relative to some user interface and sample screenshots of the user interface itself may be obtained by executing training data queries 115 against a source, such as cloud or Internet-based storage 120. Storage 120 includes user interface images and associated instructions intended to inform users regarding how to use user interfaces. The images and associated instructions may be arranged as pairs, with each pair including an image and at least one instruction corresponding to the image.

The query returns images and text that are used as training data to train the model 110 to represent user interfaces. Instructions and images of user interfaces represent a new type of training data that can be obtained from instruction manuals, tutorials, and how-to guides that abound on the Internet (such as in technical support and how-to websites), exist for many different applications and platforms, and are easy to crawl.

In addition to textual instructions, for clarity, such training data usually includes visual information. The visual and textual descriptions are used to learn visually grounded textual representations of UI screens and their elements by model 110.

A detector 125 performs functions of extracting information from the training data images. A two-stage object detection network may be used to generate region proposals from an image using standard computer vision techniques and utilize an image classifier to determine a class of an object in each region proposal. A ResNet image classifier fine-tuned on a dataset of mobile device user interface elements may be used. Alternatively, a machine learning object detection model trained large numbers of user interface images may be used. Text elements may also be detected and recognized. The text elements detected in the image data may be combined with text input, such as image captions or instructions associated with the image to form the input text. The input text may be tokenized.

Model 110 may include a vision component 130 and a language component 135. The image data, including the detected and classified elements and extracted features, is provided to the vision component 130. Similarly, the text data is provided to the language component 135. The vision and language model 110 is trained in a self-supervised manner utilizing masking-based techniques 145. Masking techniques basically mask portions of the input in each respective component and have the model make a prediction of the masked portion. Since the masked portion is known, referred to as a ground truth, the accuracy of the prediction is easy to determine and to provide feedback to improve the model.

Image text alignment 150 may be performed together with masking to train the model 110 to predict a score as output 155. A binary cross-entropy loss may be applied to modify model weights to improve performance of the model. The model may be trained using the mask-based techniques, image text alignment, and optionally parts of speech techniques concurrently. Other pre-training tasks may be considered such as text-based image retrieval, image and text entailment, next instruction prediction, etc.

Figure 2:
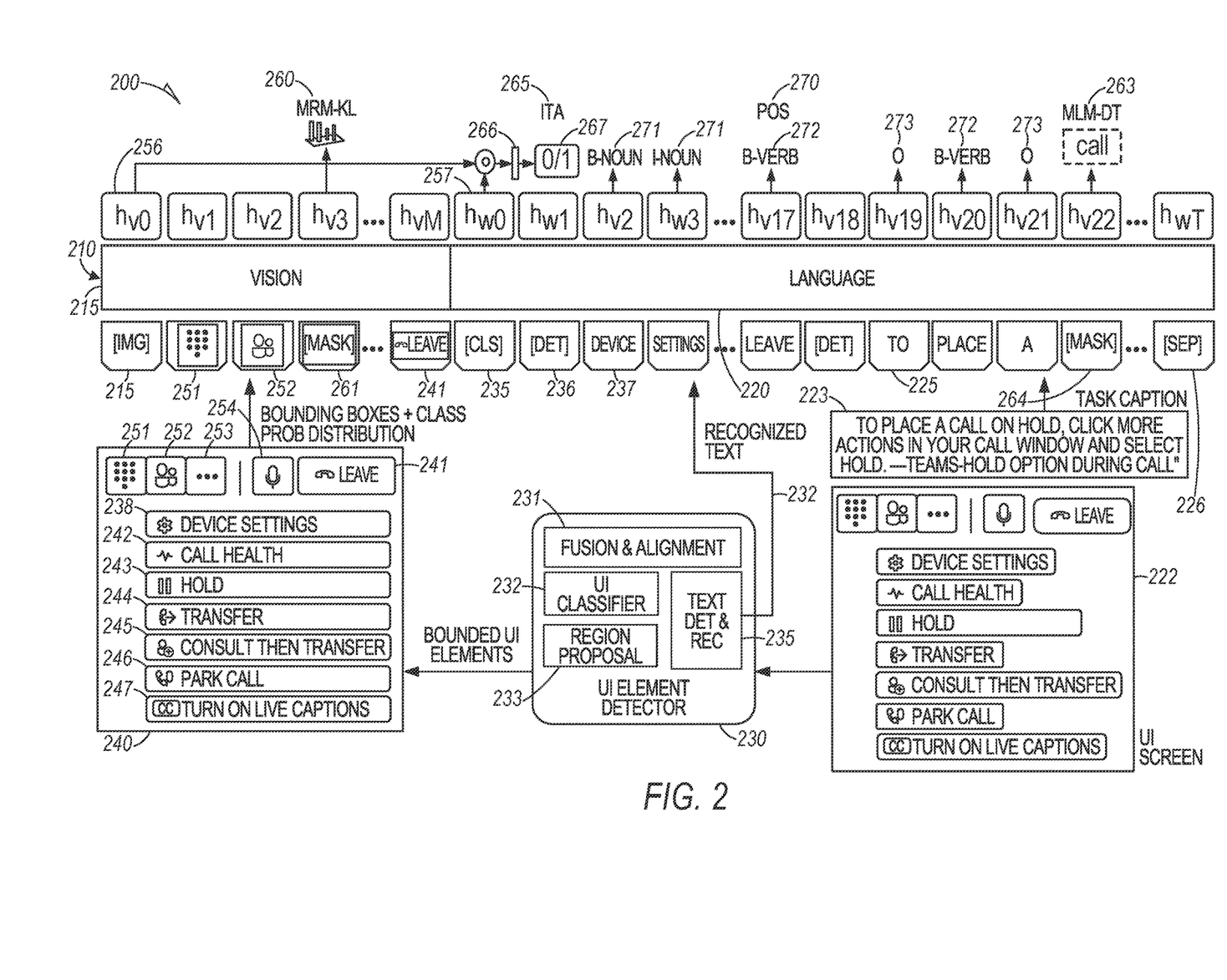
FIG. 2 is a block flow diagram illustrating training vision and language transformer encoder model for understanding user interfaces according to an example embodiment.

FIG. 2 is a block flow diagram illustrating training generally at 200 a combined vision and language (VL) transformer encoder model that includes a VL model 210 for understanding user interfaces. VL model 210 has a two-stream architecture, one for a vision component 215 and one for a text component 220 that each consist of a series of transformer blocks and co-attentional transformer layers for cross-model representation learning.

An example training data for the VL model 210 includes an image of a user interface screen 222 and a text caption 223 consisting of instructions on how to use the interface screen 222, which were extracted from a user manual. The training data may be accessed from previously collected information or may be accessed via training data queries as described above. Text 223 is tokenized and provided to text component 220 as shown beginning at token 225 and extending to [SEP] token 226. A [DET] token 227 indicates the beginning of the tokens for text 223.

In one example, the [DET] token 227 indicates a concatenation of the text 223 with text derived from the image 222 by a user interface element detector 230. Detector 230 provides several functions, including region proposal generation at 233 which detects coordinates of user interface elements present in image 222, fusion (merging) and alignment of the detected user interface elements at 231, classification of user interface elements at 232, and text detection and recognition at 235. Fusion, or merging and alignment of user interface elements may be performed by combining non-text elements and text element predictions through simple geometric rules. Adjacent elements that are horizontally or vertically aligned may be merged.

The recognized text from detector 230 is provided at 234 as tokens to the language component 220. A [CLS] token 235 is used to indicate the beginning of text with a further [DET] token 236 used to indicate the concatenation or addition of text, such as text token 237 which represents the word "device" derived from a bounded user interface element 238 that includes the text "device settings."

Image 222 is shown again at 240 with bounding boxes of the textual and visual elements detected in the image which include text indicated at 238 "Device Settings," 241 "Leave," 242 "Call health," 243 "Hold," 244 "Transfer," 245 "Consult then transfer," 246 "Park Call." and 247 "Turn on live captions." Each of these words may also be provided to the language component 220 as tokens as represented by " . . . " indications between the tokens shown as input to the language component 220.

Four of the bounding boxes, 251, 252, 253, and 254 contain only visual content, and may be icons that are selectable by a user. Image region features are provided as input to the vision component 215 with an [IMG] token 255 indicating the beginning of the image tokens. The same reference numbers are used for the bounding boxes in image 240 and for the image feature representations. Image 240 also includes other icons associated with the text in some of the bounding boxes and may also be input as image tokens. Each of the image tokens provided to vision component 215 also includes a classification label and a probability distribution generated by detector 230.

VL model 210 is a transformer-based bidirectional language and vision model. VL model 210 can transfer learned features to multiple NLP and vision tasks. On a high level, VL model 210 takes in the embedding of word tokens and images and processes them through a multi-layer bidirectional transformer. Language component 220 is a transformer-based bidirectional language model.

Given a text input, word tokens $w_1, \ldots, w_T$ and an image I, image tokens, represented as a set of region features $v_1, \ldots, v_M$, VL model 210 outputs final vector representations $h_0, \ldots, h_{vM}$ for vision information and $h_{w0}, \ldots, h_{wT}$ for text information beginning at 256 and 257 respectively. Text is encoded as a sequence of word tokens prepended with the [CLS] token. Sentence pairs are packed together into a single input sequence and distinguished using the [SEP] token. For a given token, the input representation is a sum of a token, segment, and position embedding. An image is encoded by extracting bounding boxes of its regions of interest and corresponding visual features using the classifier 232 such as an object detection model Faster R-CNN with ResNet-101 pre-trained on Visual Genome. Spatial location and fraction of the image area covered are also encoded.

The VL model 210 is then pre-trained with multiple concurrently performed pre-training tasks including masked multi-modal modeling and multi-modal alignment prediction. The vision component of the VL model 210 may be trained using masked region modeling with DL divergence (MRM-KL) 260 by masking one or more image tokens of the input to the vision model 210 as shown by the masking technique 261. In one example, image regions are sampled, and visual features are masked with a probability of 15% in one example, or other selected probability which may be determined empirically. Zeros may be used to replace the actual values to perform the masking. The VL model 210 is tasked with reconstructing the masked regions given the remaining regions and the input words. However, the model is unlikely to be able to reconstruct exact image features. The model predicts a distribution over semantic classes for the corresponding image region and minimizes the KL divergence between the original class probabilities of the unmasked region and the predicted class probabilities. Cross-entropy loss may be used to adjust weights of the model for such minimization.

Similarly, language component 220 may also be trained using masked language modeling with detected text (MLM-DT) 263 by masking one or more text tokens of the input to the language component 220 as shown by the masking technique 264. In one example, input words are randomly masked out with probability of 15% in one example. Other probabilities may be used in further examples. The masked input words are replaced with the special token [MASK] 264 which may be all zeros. A key difference from current VL models is that in VL model 210 any text detected in the visual input is appended to the text input, and its words may also be masked. This further teaches the VL model 210 to align the detected text with the visual content, especially the image regions containing the detected text. A standard cross-entropy loss may be used to learn the weights of the model.

The above masked-based training of the vision and language model 210 is performed separately for text and images. Masking only one modality at a time while keeping the other modality intact improves performance. Since the ground truth (the actual data that is masked) is known, training may be self-supervised, removing the need for human labeled data in the training of the models.

Image-text alignment (ITA) 265 may also be performed concurrently with the mask-based training as part of the pre-training of VL model 210. ITA is useful for learning representations for downstream cross-modal tasks. It is a binary classification task. The dot product 266 of the hidden representations for the image stream and text stream are calculated. The corresponding cross-modal representation is fed into a feed-forward layer to predict a score 267 between 0 and 1. During training, a positive or negative pair is sampled at each step. In one example, the negative pair is created by sampling text samples that are within a distance of, for example, 0.5 in cosine-similarity with the ground-truth text using a sentence-vector similarity. Due to prevalence of common technical terms, the task captions tend to be semantically very similar. A binary cross-entropy loss is applied for training.

A challenge with text embeddings related to user interfaces is that text inputs inevitably exhibit a high recurrence of technical terms such as "click", "tap". "type", "button", etc. Many of these terms have high similarity using out-of-the-box language models such as BERT and RoBERTa, and some terms (e.g., "menu", "bar", etc.) have an entirely different meaning in a general domain. To help the VL model 210 learn the syntax of UI instructions, a weakly-supervised part-of-speech (POS) tagging may be performed as an additional pre-training task concurrently with the other pre-training tasks.

In POS Tagging (POS) the VL model 210 is trained to predict noun 271 and verb 272 spans present in the text. Learning to recognize parts of speech and how they relate to each other is useful for the VL model 210 to learn the "foreign" UI language and understand the meaning of highly recurrent technical terms. This is helpful for applications where text plays a predominant role in the prediction such as user interface entity recognition. The POS features are encoded in the learned representations during pre-training. In one example, SpaCy's POS tagger's predictions may be used as weak-supervision labels for learning the task. A BIO scheme may also be used. Each token representation may be classified as the beginning (B) or the inside (I) of a noun or verb entity, or as other (O) at 273, i.e., a non-entity token. Cross-entropy loss may be used.

In summary, the total pre-training loss L with scalar coefficients $\alpha, \beta, \gamma, \delta \in (0; 1)$ is given by:

$$\mathcal{L} = \alpha \cdot \mathcal{L}_{MLM\text{-}DT} + \beta \cdot \mathcal{L}_{MRM\text{-}KL} + \gamma \cdot \mathcal{L}_{ITA} + \delta \cdot \mathcal{L}_{POS}$$

where $\mathcal{L}_x$ is the loss for the pre-training task x.

The collection of training data may be performed in one example by generating search queries using UI element names and sample instructions extracted from manuals, such as Microsoft®- and Android® manuals. An image search may be performed using one of many image-based search engines such as Google® image search for each query. Some top results, for example 50 or 100, are inspected to collect thousands of URLs of technical webpages. Each page may be crawled. General heuristics are used to extract images along with their alt-text and preceding texts.

By selecting the source webpages, this process ensures the collected images are indeed of UI elements and screenshots.

For each UI image some number of captions may be generated (e.g., 1 to 5 captions per image). The number of captions generated depends on the length and structure of the preceding text. The image's alt-text may be appended to the generated caption. The captions are referred to as task captions because rather than describing the appearance of an image such as is commonly done with alt-text, the captions describe functionality of UI elements. This textual context often translates into spatial context because the instructions to accomplish a task usually involve nearby UI elements.

Figure 3A:
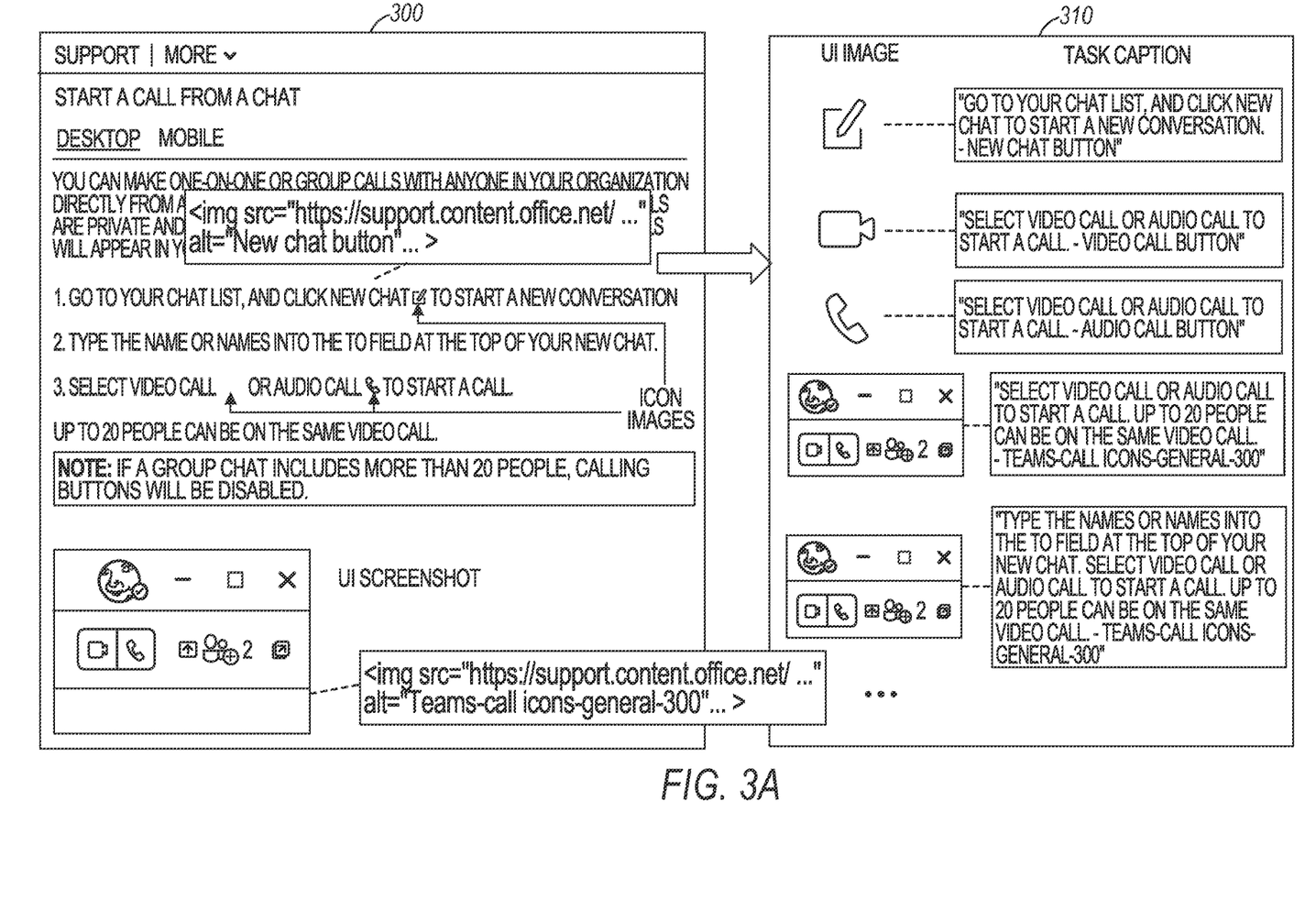
FIG. 3A is an example of an instruction manual with generated image-caption pairs according to an example embodiment.

FIG. 3A is an example of an instruction manual 300 with generated image-caption pairs 310. The instruction "Select Video call or Audio call to start a call" is used as the captions of both the "Video call" and "Audio call" icons. The instruction defines a logical relationship between the "Video call" and "Audio call" functions, but also a spatial relationship, i.e., the two icons appear next to each other in the UI.

In one example 198 k UI image and caption pairs, split across 4 datasets: Mixed (154,196 pairs, containing UI data for many different apps, may be obtained using a generic crawler), MS (34,523 pairs, covering Microsoft apps), Teams® (8,778 pairs), and Zoom® (472 pairs). The crawled UI images may be used to train current UI understanding models.

Figure 3B:
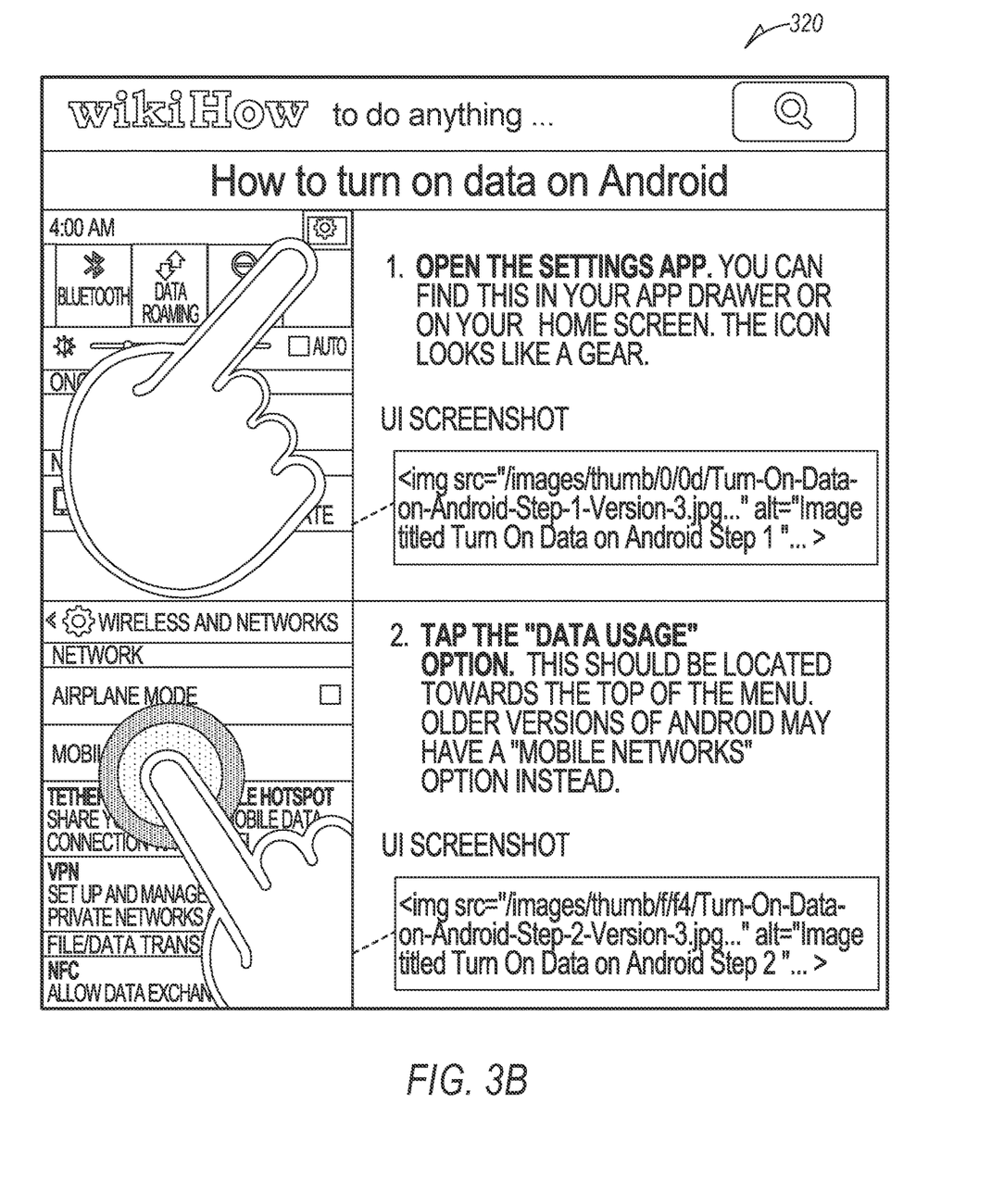
FIG. 3B is an example manual illustrating an annotated user interface according to an example embodiment.

The crawled training data may be extremely varied in terms of applications (Excel, Gmail, Chrome, Photos, etc.), platforms (mobile & desktop), number of UI components (from a single icon to a complete desktop), text density (Word documents, photos, or Excel spreadsheets), pixel density, and quality (e.g., screenshots may not be pristine or may have been annotated.) FIG. 3B is an example manual illustrating an annotated user interface at 320.

The trained VL model 210 may be subsequently fine-tuned (trained with smaller but specialized sets of data) to perform specific tasks with higher accuracy. Fine tuning may involve small quantities of manually labeled data such as real user commands in natural language and corresponding sequences of UI actions. The process of fine-tuning may be specific to a target task or to a class of target tasks.

In one example of the fine-tuning task, the trained VL model 210 may be further trained to predict whether a user interface action can be recognized and performed. One example is a natural language instruction such as "Select video call or audio call to start a call". This type of task has practical use in screen readers to locate UI components by their name/functionality in the absence of accessibility labels and alt-tests.

In a further example, the trained VL model 210 may be fine-tuned for task-based UI image retrieval. In one example, a goal may be to identify a UI image from a pool of 50 images given a description of an associated task.

In yet a further example, the trained VL model 210 may be fine-tuned to select a UI element referenced by an expression in natural language from a set of elements detected on a screen. This task is relevant to voice-guided navigation agents, where users can issue commands like "click home at the top" and the navigation system identifies the corresponding "home" icons and clicks on it.

Still a further example includes given a UI image and an instruction as input, the trained VL model 210 may be fine-tuned to extract spans of UI action verbs, UI action objects, and input parameters. The task is relevant to task completion systems to translate commands into executable procedures consisting of low-level UI interactions. A key challenge in this task is that not all instances of a word are of the same entity type. For example, the word "Alexa" may represent an input, but "Alexa app" may not represent an input. "Search" may often represent a UI action object, (e.g., a search box) but in other instances may be a UI action verb.

The pre-training of the VL model 210 does not rely on human-labeled data. Publicly available web data can be crawled at scale and for many different types of applications for training. This approach can alleviate the risk of training UI models that work only for certain types of applications or platforms.

Less popular applications may have less or lower-quality documentation online. One way to partly address lack of online documentation is to extend UI data collection beyond technical support websites and how-to guides to other documentation types (tutorials, bug reports, etc.) and formats (videos).

One application of the VL model includes screen readers for visually impaired users. As accessibility labels are often missing or incomplete, the use of the VL model could provide visually impaired users access to a much wider range of applications. In this regard, guaranteeing an unbiased coverage of applications and platforms is even more important.

Another potential use case is task automation, which has societal and security implications. What if an agent clicks the wrong button? Is there an "undo" option or other recourse? A significant frontier for intelligent task completion systems is architecting them such that they can increase human productivity yet remain amenable to human review.

Figure 4:
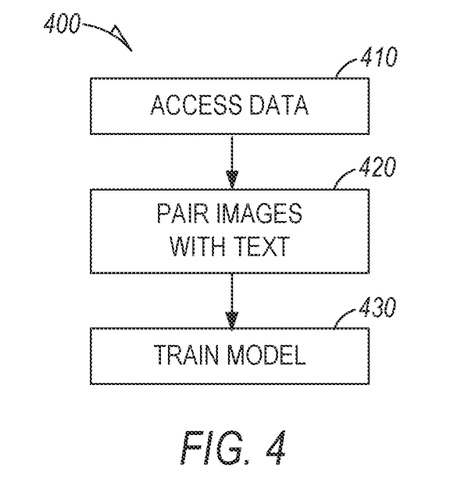
FIG. 4 is a flowchart illustrating a computer implemented method for learning user interfaces according to an example embodiment.

FIG. 4 is a flowchart illustrating a computer implemented method 400 for learning representation models of user interfaces. Method 400 begins at operation 410 by accessing training data including images, alternative text associated with an image, and texts describing the functionality of a user interface image. Each image is paired at operation 420 with a text caption consisting of at least one proximately located text description and the image's associated alternative text, if any. The text captions and images may include position embedding. An image region detector and image classifier trained on user interface elements may be executed on the images to detect bounding boxes of UI elements and generate classification labels and region features for each one. In one example, a text caption is the set of textual instructions closest (proximate) to the respective image in an instruction manual or how to guide. In another example, the text caption is the alternative text associated with the image. In another example, the text caption is the concatenation of the textual instructions with the alternative text.

The vision and language model is pre-trained at operation 430 in a self-supervised manner using the above described pre-training tasks on respective image features and tokenized text captions. These tasks may utilize techniques include language masking, image region masking, image-text alignment, and POS tagging.

Image-text alignment of the VL model enables the VL model to map user interface elements to associated functions. Image-text alignment is performed to predict a score for the pairs of user interface images and corresponding descriptions. The image-text alignment of the vision and language model may be performed using samples of positive and negative pairs applying binary cross-entropy loss. The pre-trained VL model is a vision language transformer encoder.

Pre-training of the language model at operation 430 optionally includes using part of speech tagging. Part of speech tagging includes training the language component to predict noun and verb spans using a cross-entropy loss.

Figure 5:
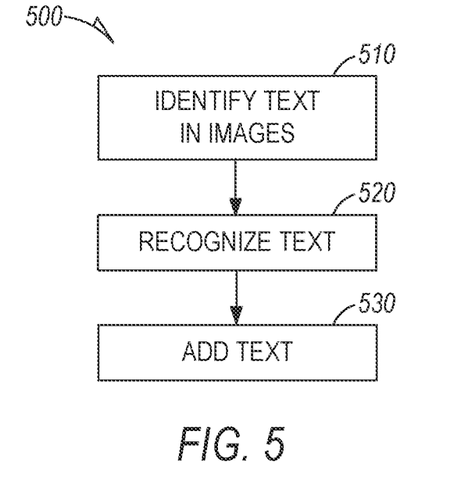
FIG. 5 is a computer implemented method of including recognized text from images in text captions used to train a language model according to an example embodiment.

FIG. 5 is a computer implemented method 500 of including detecting and recognizing text from images to be included in text captions to train the VL model. Operation 500 begins by identifying text in the images at operation 510. The text is recognized at operation 520 to generate recognized text. At operation 530, the recognized text is added to the text captions that are used to train the VL model. The recognized text and the proximately located text captions provided to the VL model are tokenized with respective sets of text tokens separated by a [DET] token.

Figure 6:
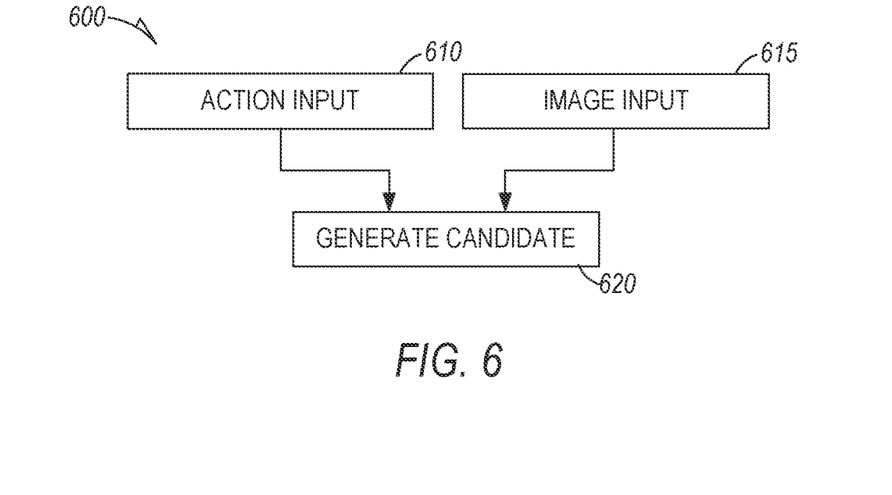
FIG. 6 is a flowchart illustrating a computer implemented method of using a vision learning model to identify user interface elements corresponding to actions to be performed according to an example embodiment.

FIG. 6 is a flowchart illustrating a computer implemented method 600 of using a VL model to identify user interface elements corresponding to actions specified in natural language to be performed in a user interface. Method 600 begins by providing two inputs to the VL that was trained in method 400. A first input, provided at operation 610, relates to an action to be performed. In one example, the first input may be a user command in natural language that may be typed or spoken and converted to text. At operation 615, a second input is provided and consists of an image of the user interface to be used. The second input may be a screenshot of the user interface of an application with which the user is currently interacting. At operation 620, the model transforms, encodes, and classifies the inputs to generate an output identifying a candidate user interface element for performing the action.

Figure 7:
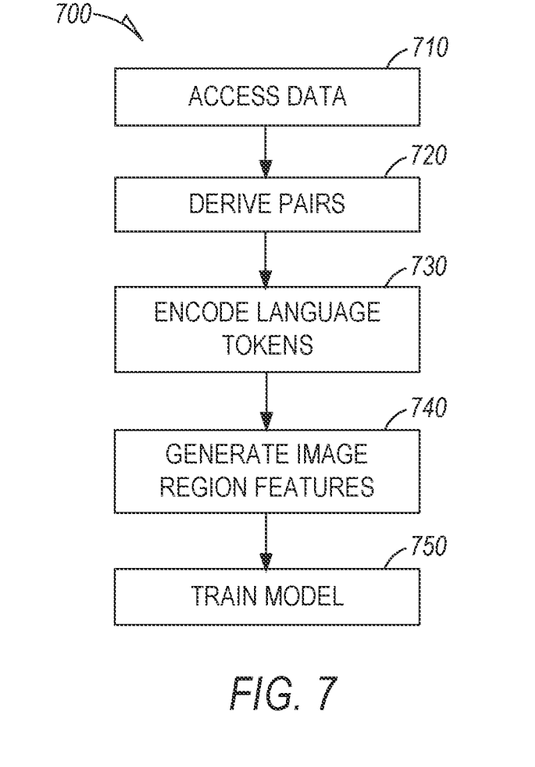
FIG. 7 is a flowchart illustrating a further computer implemented method for learning user interfaces according to an example embodiment.

FIG. 7 is a flowchart illustrating a further computer implemented method 700 for learning representation models of user interfaces. Method 700 begins at operation 710 by accessing training data including pairs of user interface images, image's alternative text, and text-based user interface descriptions. Pairs of user interface images and corresponding text captions descriptions derived from the training data are generated at operation 720. At operation 730, the text descriptions are encoded as language tokens and passed to the language component of the vision and language model. At operation 740, the images are encoded as bounding boxes and associated image region features and passed to the vision component. Self-supervised pre-training of the language model is performed at operation 750 concurrently using the above-described pre-training tasks including using masked language modeling with detected text. Self-supervised training of the VL model is performed using masked region modeling with KL divergence. Image-text alignment is performed by applying a binary cross-entropy loss to enable the VL model to map user interface elements to associated functionality. Further concurrent pre-training of the VL model is performed using part of speech tagging. Part of speech tagging may include training the language component of the VL model to predict noun and verb spans using a cross-entropy loss.

Figure 8:
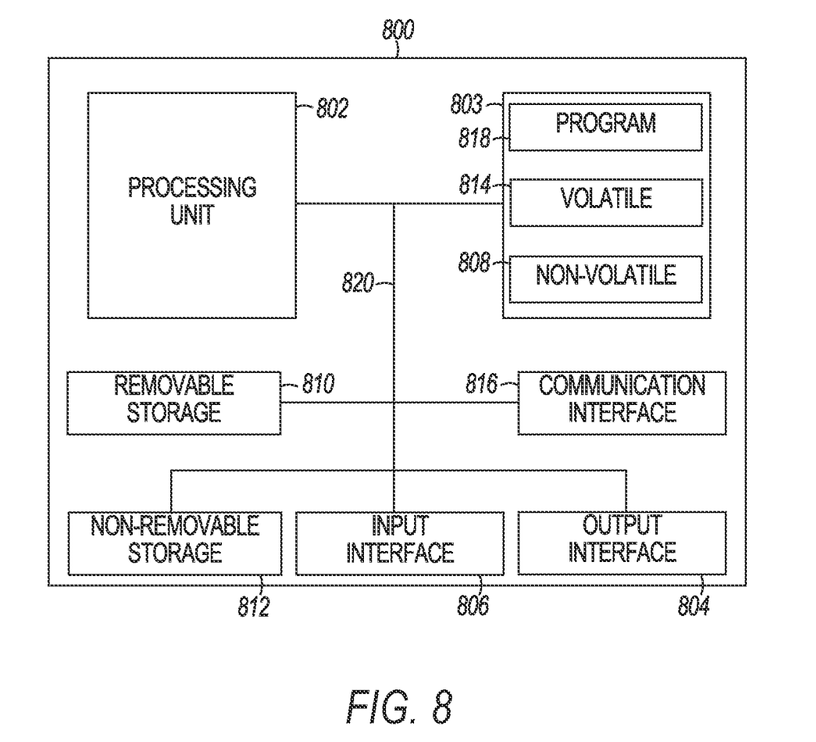
FIG. 8 is a block schematic diagram of a computer system to implement one or more example embodiments.

FIG. 8 is a block schematic diagram of a computer system 800 to implement the VL model 210 for representing user interfaces and for performing methods and algorithms according to example embodiments. All components need not be used in various embodiments.

One example computing device in the form of a computer 800 may include a processing unit 802, memory 803, removable storage 810, and non-removable storage 812. Although the example computing device is illustrated and described as computer 800, the computing device may be in different forms in different embodiments. For example, the computing device may instead be a smartphone, a tablet, smartwatch, smart storage device (SSD), or other computing device including the same or similar elements as illustrated and described with regard to FIG. 8. Devices, such as smartphones, tablets, and smartwatches, are generally collectively referred to as mobile devices or user equipment.

Although the various data storage elements are illustrated as part of the computer 800, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 803 may include volatile memory 814 and non-volatile memory 808. Computer 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 800 may include or have access to a computing environment that includes input interface 806, output interface 804, and a communication interface 816. Output interface 804 may include a display device, such as a touchscreen, that also may serve as an input device. The input interface 806 may include one or more of a touchscreen, touchpad, mouse, keyboard, camera, one or more device-specific buttons, one or more sensors integrated within or coupled via wired or wireless data connections to the computer 800, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth. or other networks. According to one embodiment, the various components of computer 800 are connected with a system bus 820.

Computer-readable instructions stored on a computer-readable medium are executable by the processing unit 802 of the computer 800, such as a program 818. The program 818 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 818 along with the workspace manager 822 may be used to cause processing unit 802 to perform one or more methods or algorithms described herein.

Examples

1. A computer implemented method includes accessing training data that includes images, associated alternative text, and proximately located text providing instructions describing a user interface, pairing each image with text captions derived from the proximately located text and image's alternative text, training a vision and language model in a self-supervised manner using language masking, region masking, and image-text alignment techniques on respective image region features and tokenized text captions, and performing fine-tuning of the vision and language model to obtain a specialized model representing user interface elements and associated functions.

2. The method of example 1 wherein the language masking, region masking, and image-text alignment techniques are performed concurrently.

3. The method of any of examples 1-2 wherein training the vision and language model further includes concurrently performing part-of-speech tagging wherein part of speech tagging comprises training a language component of the vision and language model to predict noun and verb spans using a cross-entropy.

4. The method of any of examples 1-3 and further including identifying text in the images, recognizing the text to generate recognized text, and adding the recognized text to the text input used by the language component to train the vision and language model.

5. The method of example 4 wherein the recognized text and the text captions provided to the language component are tokenized with respective sets of text tokens separated by a [DET] token.

6. The method of any of examples 1-5 wherein the text captions and images include position embedding.

7. The method of any of examples 1-6 and further including executing an image region detector and image classifier trained on user interface elements on the images to generate bounding boxes, classifications for the image regions and image region features and including the bounding boxes, classification for the image regions and image region features used by the vision component to train the vision and language model.

8. The method of any of examples 1-7 wherein the masking technique used in training the vision and language model includes using masked region modeling with KL divergence for a vision component of the vision and language model.

9. The method of any of examples 1-8 wherein the masking technique used in training the vision and language model includes using masked language modeling with detected text for a language component of the vision and language model.

10. The method of any of examples 1-9 wherein performing image-text alignment of the vision and language model is performed to predict a score for the pairs of user interface images and corresponding descriptions.

11. The method of example 10 wherein performing image-text alignment of the vision and language model is performed using samples of positive and negative pairs defined by cosine-similarity and applying binary cross-entropy loss.

12. The method of any of examples 1-11 wherein the vision and language model includes a vision language transformer encoder.

13. The method of any of examples 1-12 and further including providing an input related to an action to be performed to the specialized model and a user interface image and receiving an output identifying a candidate user interface element for performing the action in the user interface image.

14. A machine-readable storage device has instructions for execution by a processor of a machine to cause the processor to perform operations to perform any of the methods of examples 1-13.

15. A device includes a processor and a memory device coupled to the processor and having a program stored thereon for execution by the processor to perform operations to perform any of the methods of examples 1-13.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
accessing training data including user interface images, associated text recognized from the user interface images, and proximately located text providing instructions describing use of the user interface;
pairing each image with text captions derived from the proximately located text and image's text recognized from the user interface images;
training a vision and language model in a self-supervised manner using language masking, region masking, and image-text alignment techniques on respective image region features and tokenized text captions; and
performing fine-tuning of the vision and language model to obtain a specialized model representing user interface elements and associated functions.

2. The method of claim 1 wherein the language masking, region masking, and image-text alignment techniques are performed concurrently, and wherein the training data is accessed from at least one of instruction manuals, tutorials, how-to guides.

3. The method of claim 1 wherein training the vision and language model further comprises performing part-of-speech tagging wherein part of speech tagging comprises training a language component of the vision and language model to predict noun and verb spans using a cross-entropy loss.

4. The method of claim 1 and further comprising:
identifying text in the images;
recognizing the text to generate recognized text; and
adding the recognized text to the text input used by the language component to train the vision and language model.

5. The method of claim 4 wherein the recognized text and the text captions provided to the language component are tokenized with respective sets of text tokens separated by a token.

6. The method of claim 1 wherein the text captions and images include position embedding.

7. The method of claim 1 and further comprising:
executing an image region detector and image classifier trained on user interface elements on the images to generate bounding boxes, classifications for the image regions and image region features; and
including the bounding boxes, classification for the image regions and image region features used by the vision component to train the vision and language model.

8. The method of claim 1 wherein the masking technique used in training the vision and language model comprises using masked region modeling with KL divergence for a vision component of the vision and language model.

9. The method of claim 1 wherein the masking technique used in training the vision and language model comprises using masked language modeling with detected text for a language component of the vision and language model.

10. The method of claim 1 wherein performing image-text alignment of the vision and language model is performed to predict a score for the pairs of user interface images and corresponding descriptions.

11. The method of claim 10 wherein performing image-text alignment of the vision and language model is performed using samples of positive and negative pairs defined by cosine-similarity and applying binary cross-entropy loss.

12. The method of claim 1 wherein the vision and language model comprises a vision language transformer encoder.

13. The method of claim 1 and further comprising:
providing an input related to an action to be performed to the specialized model and a user interface image; and
receiving an output identifying a candidate user interface element for performing the action in the user interface image.

14. A machine-readable storage device having instructions for execution by a processor of a machine to cause the processor to perform operations to perform a method, the operations comprising:
accessing training data including user interface images, associated text recognized from the user interface images, and proximately located text providing instructions describing use of the user interface;
pairing each image with text captions derived from the proximately located text and image's text recognized from the user interface images;
training a vision and language model in a self-supervised manner using language masking, region masking, and image-text alignment techniques on respective image region features and tokenized text captions; and
performing fine-tuning of the vision and language model to obtain a specialized model representing user interface elements and associated functions.

15. The device of claim 14 wherein the language masking, region masking, and image-text alignment techniques are performed concurrently, and wherein the training data is accessed from at least one of instruction manuals, tutorials, how-to guides.

16. The device of claim 14 wherein training the vision and language model further comprises performing part-of-speech tagging wherein part of speech tagging comprises training a language component of the vision and language model to predict noun and verb spans using a cross-entropy loss.

17. The device of claim 14 wherein the operations further comprise:
identifying text in the images;
recognizing the text to generate recognized text; and
adding the recognized text to the text input used by the language component to train the vision and language model.

18. The device of claim 14 wherein the operations further comprise:
executing an image region detector and image classifier trained on user interface elements on the images to generate bounding boxes, classifications for the image regions and image region features; and
including the bounding boxes, classification for the image regions and image region features used by the vision component to train the vision and language model.

19. The device of claim 14 wherein training the vision and language model further comprises performing part-of-speech tagging, and wherein the language masking, region masking, image-text alignment, and part-of-speech tagging techniques are performed concurrently.

20. A device comprising:
a processor; and
a memory device coupled to the processor and having a program stored thereon for execution by the processor to perform operations comprising:
accessing training data including user interface images, associated text recognized from the user interface images, and proximately located text providing instructions describing use of the user interface;
pairing each image with text captions derived from the proximately located text and image's text recognized from the user interface images;
training a vision and language model in a self-supervised manner using language masking, region masking, and image-text alignment techniques on respective image region features and tokenized text captions; and
performing fine-tuning of the vision and language model to obtain a specialized model representing user interface elements and associated functions.

* * * * *